US009792016B2

(12) United States Patent
Sakurai

(10) Patent No.: US 9,792,016 B2
(45) Date of Patent: Oct. 17, 2017

(54) INFORMATION PROCESSING APPARATUS AND INPUT CONTROL METHOD

(71) Applicant: FUJITSU LIMITED, Kawasaki-shi, Kanagawa (JP)

(72) Inventor: Yoko Sakurai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 415 days.

(21) Appl. No.: 14/250,791

(22) Filed: Apr. 11, 2014

(65) Prior Publication Data
US 2014/0351754 A1   Nov. 27, 2014

(30) Foreign Application Priority Data

May 23, 2013 (JP) .................................. 2013-109396

(51) Int. Cl.
G06F 3/048 (2013.01)
G06F 3/0488 (2013.01)
G06F 3/0481 (2013.01)
G06F 3/0484 (2013.01)

(52) U.S. Cl.
CPC ........ G06F 3/04842 (2013.01); G06F 3/0488 (2013.01); G06F 3/04817 (2013.01); *G06F 2203/04805* (2013.01); *G06F 2203/04806* (2013.01)

(58) Field of Classification Search
CPC ............... G06F 3/04842; G06F 3/0488; G06F 2203/04805; G06F 2203/04806
See application file for complete search history.

(56) References Cited

U.S. PATENT DOCUMENTS

| 2,273,408 | A | * | 2/1942 | Woodward | G05D 13/06 290/40 R |
| 4,783,760 | A | * | 11/1988 | Carosso | G06F 17/25 400/3 |
| 8,405,677 | B2 | * | 3/2013 | Ranford | G06F 3/04886 345/581 |
| 2002/0080152 | A1 | | 6/2002 | Sudo et al. | |
| 2004/0205642 | A1 | * | 10/2004 | Menninga | G06F 17/211 715/244 |
| 2004/0253568 | A1 | * | 12/2004 | Shaver-Troup | G09B 17/00 434/178 |
| 2007/0260981 | A1 | * | 11/2007 | Kim | G06F 3/04812 715/256 |

(Continued)

FOREIGN PATENT DOCUMENTS

| EP | 2273408 A1 | 1/2011 |
| EP | 2477105 A2 | 7/2012 |

(Continued)

OTHER PUBLICATIONS

EESR—Extended European Search Report of EP Patent Application 14165169.5, dated Jul. 25, 2014.

(Continued)

*Primary Examiner* — Andrea Long
(74) *Attorney, Agent, or Firm* — Fujitsu Patent Center

(57) ABSTRACT

A display unit displays an object. A detection unit detects a touch operation on the display unit. A change unit widens a display space of the object while keeping a display size of the object when range selection of the object displayed on the display unit is performed through the touch operation.

9 Claims, 13 Drawing Sheets

(56) References Cited

U.S. PATENT DOCUMENTS

| | | | |
|---|---|---|---|
| 2009/0002326 A1* | 1/2009 | Pihlaja | G06F 3/04812 345/173 |
| 2009/0048000 A1* | 2/2009 | Ade-Hall | G06F 3/0236 455/566 |
| 2009/0228792 A1* | 9/2009 | Van Os | G06F 3/0488 715/702 |
| 2010/0235783 A1* | 9/2010 | Ording | G06F 1/1626 715/810 |
| 2012/0044172 A1* | 2/2012 | Ohki | G06F 3/04883 345/173 |
| 2012/0182237 A1* | 7/2012 | Yun | G06F 3/04842 345/173 |
| 2012/0306778 A1* | 12/2012 | Weeldreyer | G06F 3/0488 345/173 |
| 2013/0002719 A1 | 1/2013 | Ide | |
| 2014/0208263 A1* | 7/2014 | Maklouf | G06T 3/0018 715/802 |

FOREIGN PATENT DOCUMENTS

| | | |
|---|---|---|
| JP | 2002-251241 | 9/2002 |
| JP | 2011-123575 | 6/2011 |

OTHER PUBLICATIONS

EPOA—European Office Action for European Patent Application No. 14165169.5, dated Mar. 17, 2016.

* cited by examiner

INFORMATION PROCESSING APPARATUS AND INPUT CONTROL METHOD

CROSS-REFERENCE TO RELATED APPLICATIONS

This application is based upon and claims the benefit of priority of the prior Japanese Patent Application No. 2013-109396, filed on May 23, 2013, the entire contents of which are incorporated herein by reference.

FIELD

The embodiments discussed herein are related to an information processing apparatus, an input control program, and an input control method.

BACKGROUND

In recent years, an information processing apparatus with a touch panel has been widely used. Examples of such an information processing apparatus include a smartphone and a tablet terminal.

In this type of information processing apparatus, a range of an object displayed on a screen is selected through a touch operation. For example, in the information processing apparatus, a text is displayed on the screen as the object. To select a range of the text, a start position and an end position for range selection are selected through the touch operation.

Patent Document 1: Japanese Laid-open Patent Publication No. 2002-251241

Meanwhile, in the information processing apparatus, a size of the displayed object is optimized so that a user can view the object easily. For example, the information processing apparatus displays the text with a character size suitable for viewing by a user.

However, in the information processing apparatus, even if a user attempts to select the range of the displayed object through a touch operation, the apparatus may recognize a position different from that intended by the user, and thus, the user has sometimes difficulty in selecting the range.

SUMMARY

According to an aspect of an embodiment, an information processing apparatus includes: a display unit that displays an object; a detection unit that detects a touch operation on the display unit; and a change unit that widens a display space of the object while keeping a display size of the object when range selection of the object displayed on the display unit is performed through a touch operation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Incidentally, the present invention is not limited to the embodiments, and the embodiments may be appropriately combined as long as process contents do not contradict each other.

[a] First Embodiment

Configuration of Information Processing Apparatus

Figure 1:
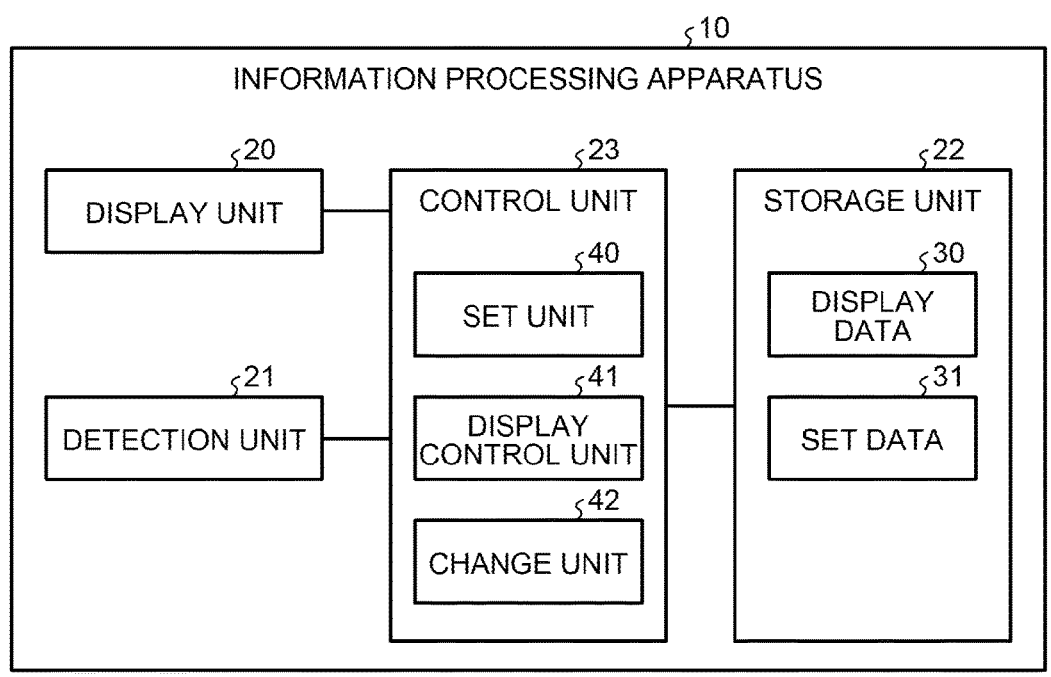
FIG. 1 is a block diagram illustrating a functional configuration of an information processing apparatus.

A functional configuration of an information processing apparatus 10 according to the present embodiment is described. FIG. 1 is a block diagram illustrating the functional configuration of the information processing apparatus. The information processing apparatus 10 enables, through a touch operation, various manipulations including designation of the range selection of an object displayed on a screen. As the information processing apparatus 10, for example, in addition to mobile terminals such as smartphones and personal digital assistants (PDA), a personal computer and a tablet terminal with a touch panel may also be adopted. Incidentally, the present embodiment is described based on a presumption that the information processing apparatus 10 is a smartphone.

As illustrated in FIG. 1, the information processing apparatus 10 includes a display unit 20, a detection unit 21, a storage unit 22, and a control unit 23. Incidentally, the information processing apparatus 10 may include various functional units of a known mobile terminal and terminal device, in addition to the functional units illustrated in FIG. 1. For example, the information processing apparatus 10 may include a network interface that communicates thorough a network, an antenna, a carrier communication unit that communicates through a carrier network, and a global positioning system (GPS) receiver.

The display unit 20 is a device that displays various types of information. Examples of the display unit 20 include a liquid crystal display (LCD) and a cathode ray tube (CRT). The display unit 20 displays various objects on the screen. For example, the display unit 20 displays a text on the screen as the object. The displayed text may be manipulated in various ways through the touch operation.

The detection unit 21 is a device that detects a touch operation on the display unit 20. Examples of the detection unit 21 include an input device such as a transmission type touch sensor provided on the display unit 20. The detection unit 21 detects the touch operation on the display unit 20 and outputs, to the control unit 23, information indicative of detected manipulation contents. Incidentally, although the example in FIG. 1 separates the display unit 20 and the detection unit 21 for illustrating the functional configuration, the information processing apparatus may be configured by a device such as the touch panel obtained by integrally providing the display unit 20 and the detection unit 21. Incidentally, the information processing apparatus 10 may include other input devices, such as a mouse, a keyboard, and various buttons.

The storage unit 22 is a storage device that stores various types of data. Examples of the storage unit 22 include a hard disk, a solid state drive (SSD), and an optical disc. Incidentally, the storage unit 22 may be a semiconductor memory, such as a random access memory (RAM), a flash memory, and a non-volatile static random access memory (NVS-RAM), all of which allow rewriting data.

The storage unit 22 stores an operating system (OS) and various programs to be executed at the control unit 23. For example, the storage unit 22 stores various programs used for input control for the range selection. Further, the storage unit 22 stores various types of data used for executing the programs at the control unit 23. For example, the storage unit 22 stores display data 30 and set data 31.

The display data 30 stores information on the object to be displayed on the screen. The present embodiment describes a case of storing text data as the object.

The set data 31 stores various types of set information. For example, the set data 31 stores information on whether a display space of the object is widened during the range selection of the object displayed on the screen.

The control unit 23 is a device that controls the information processing apparatus 10. As the control unit 23, an electronic circuit such as a central processing unit (CPU) and a micro processing unit (MPU), and an integrated circuit such as an application specific integrated circuit (ASIC) and a field programmable gate array (FPGA) may be adopted. The control unit 23 includes an internal memory for storing the program specifying a procedure of various processes and control data. The control unit 23 executes various processes using the memory. When various programs are run in the control unit 23, the control unit 23 functions as various process units. For example, the control unit 23 includes a set unit 40, a display control unit 41, and a change unit 42 as process units.

The set unit 40 is a process unit that makes various types of setting. For example, the set unit 40 sets whether the display space of the object is widened when the range selection of the object displayed on the display unit 20 is performed through the touch operation. Upon receiving a predetermined manipulation designating to make setting, the set unit 40 causes the display unit 20 to display a setting screen and allows a user to set, through the setting screen, whether the display space of the object is widened during the range selection. Then, the set unit 40 stores, in the set data 31, a selection result on the setting screen.

Figure 2:
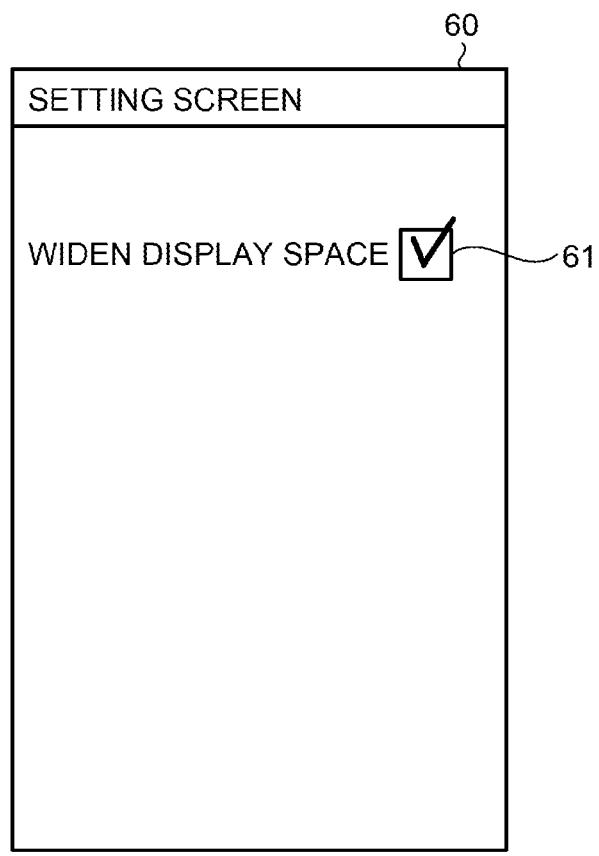
FIG. 2 is a diagram illustrating one example of a setting screen.

FIG. 2 is a diagram illustrating one example of the setting screen. A setting screen 60 includes a selection area 61 through which a user may select whether the display space of the object is widened during the range selection. If a user intends to widen the display space of the object during the range selection, the user selects the setting of widening the display space through the selection area 61. The example of FIG. 2 illustrates the selected setting of widening the display space of the object during the range selection.

Returning to FIG. 1, the display control unit 41 is the process unit that controls the display unit 20 to display various types of information. For example, the display control unit 41 controls the display unit 20 to display the object. As one example, upon receiving a predetermined manipulation designating the display of the display data 30, the display control unit 41 controls the display unit 20 to display a display screen. On the display screen, the text stored as the object in the display data 30 is displayed.

Figure 3:
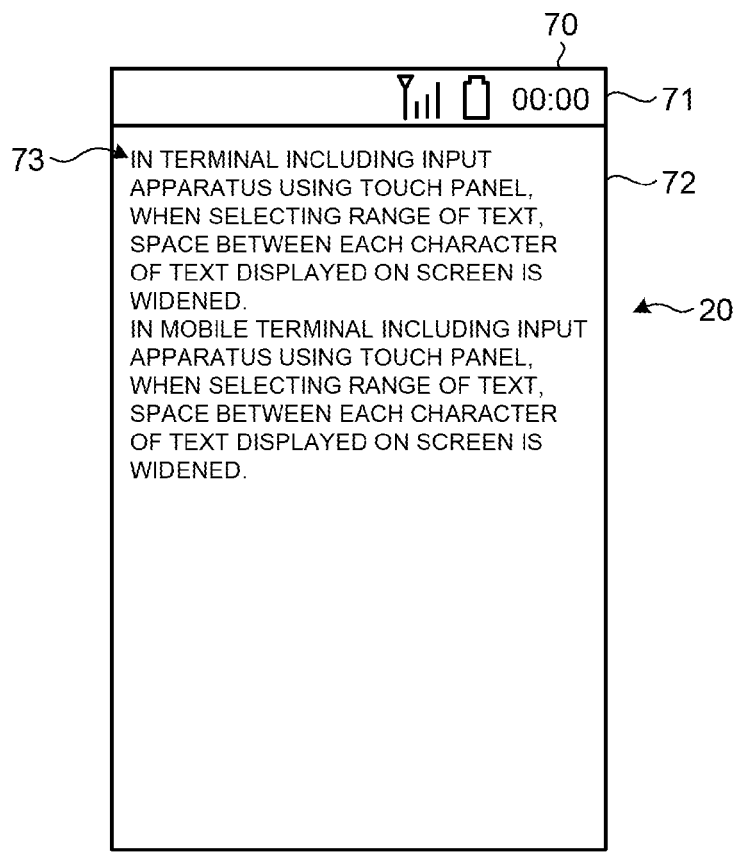
FIG. 3 is a diagram illustrating one example of a display screen.

FIG. 3 is a diagram illustrating one example of the display screen. a display screen 70 includes a plurality of display areas. For example, the display screen 70 includes a status bar 71 and a desktop 72 as the display areas. The status bar 71 displays radio wave strength of the carrier network, a charging condition of a battery of the information processing apparatus 10, and clock time. The desktop 72 can display various types of information. In the example of FIG. 3, a text 73 is displayed on the desktop 72 as the object.

In the information processing apparatus 10, various manipulations are allowed by touching the display unit 20. For example, as editing of the text, the information processing apparatus 10 may select a range of the text for copying, cutting, and deleting. If a user intends to select a range of the text for copying, cutting, and deleting, the user performs a predetermined manipulation on the information processing apparatus 10, such as a long press of the desktop 72 of the display screen 70, for designating a start of the range selection.

The change unit 42 is a process unit that changes, during the range selection, the display space of the object displayed on the display unit 20. Upon receiving the predetermined manipulation designating a start of the range selection, the change unit 42 refers to the set data 31 and determines whether a user has selected the setting of widening the display space of the object during the range selection. If the user has selected the setting of widening the display space, the change unit 42 widens the display space of the object while keeping a display size of the object displayed on the display unit 20.

For example, the change unit 42 widens the space between each character of the text while keeping a character size of the text displayed on the display unit 20. As one example, the change unit 42 changes the setting of the space between each character, such as a property of the space between each character of the text, so that the space between each character of the text displayed on the display unit 20 is changed to a predetermined space. The predetermined space may be one obtained by a test and the like and stored in the set data 31. In the test, for example, the display unit 20 is made to display the object such as the text to allow a user to select the range, thereby obtaining the space improving the operability during the range selection while suppressing degradation of visibility of the object. Alternatively, the predetermined space may be, for example, an arrangement space between each key of a software keyboard of the information processing apparatus 10. For example, in the information processing apparatus 10, if a software keyboard having a QWERTY keyboard layout is displayed for an input, the predetermined space may be an arrangement space between each key of the software keyboard having the QWERTY keyboard layout. Incidentally, the change unit 42 may add space between each character of the text to widen the space between each character of the text displayed on the display unit 20. Further, if a value of the display space of the object displayed on the display unit 20 is equal to or less than a predetermined value, the change unit 42 may widen the display space. This predetermined value may be, for example, the value of the above-described predetermined space, and also may be a specific value equal to or less than the value of the predetermined space. Such specific value may lead to a difficulty in selecting the range.

Figure 4:
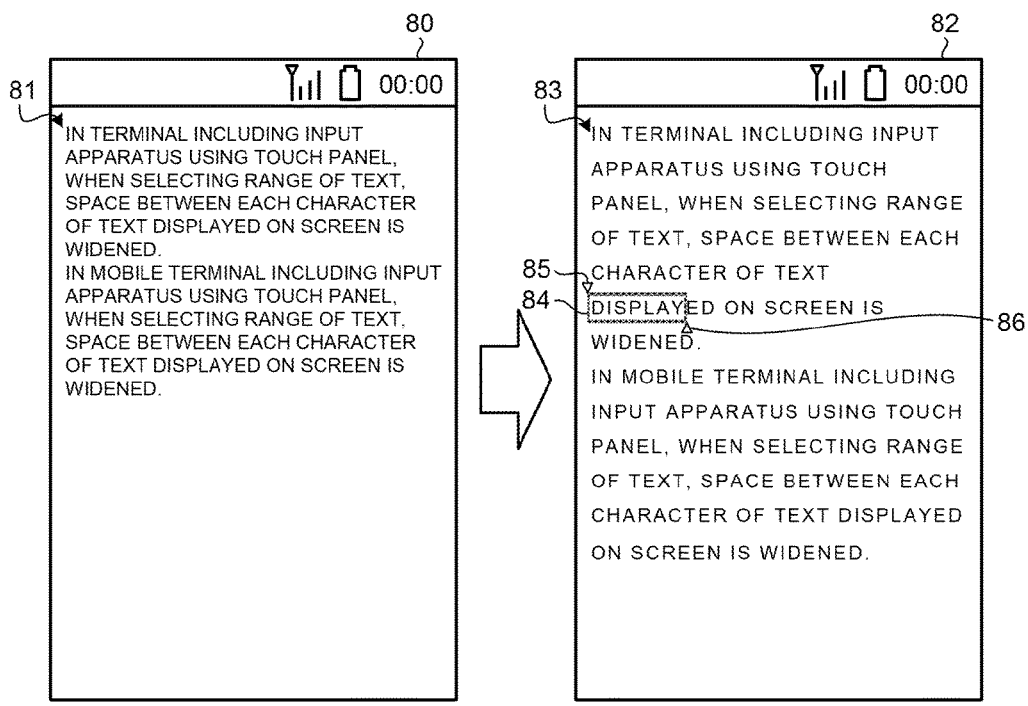
FIG. 4 is a diagram illustrating one example of a change in the display screen.

FIG. 4 is a diagram illustrating one example of a change in the display screen. In the example of FIG. 4, as illustrated in a text 83 on a display screen 82 on the right, the space between each character of a text 81 displayed on a display screen 80 on the left is widened with a character size maintained. Further, on the display screen 82 on the right, a start cursor 85 indicative of a start position of a selected range 84 and an end cursor 86 indicative of an end position of the selected range 84 are illustrated.

When the range selection ends, the change unit 42 returns the display space of the object displayed on the display unit 20 to the original space. More specifically, upon receiving the manipulation designating an end of the range selection, the change unit 42 returns the display space of the object displayed on the display unit 20 to the original space. For example, if the change unit 42 has changed the setting for the space between each character to change the space between each character of the text, the setting for the space between each character is returned to the original setting of when the range selection has been started. Further, if the space is added to change the space between each character of the text, the change unit 42 deletes the added space.

As described above, in the information processing apparatus 10 according to the present embodiment, the space between each character of the text is widened when the range selection of the text is performed through the touch operation by a user. This reduces the possibility that the information processing apparatus 10 may recognize positions, which are different from those intended by a user, as the start position and the end position. Therefore, the operability during the range selection may be improved.

Flow of Processes

Figure 5:
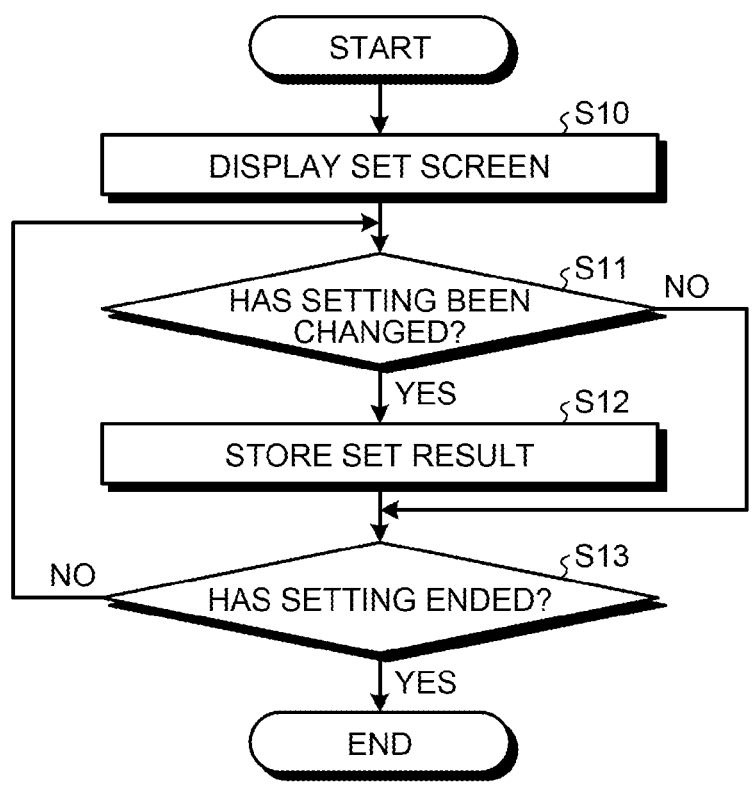
FIG. 5 is a flowchart illustrating one example of a procedure of set processes according to a first embodiment.

Next, the flow of various processes of the information processing apparatus 10 according to the present embodiment is described. First, with respect to the information processing apparatus 10 according to the present embodiment, a description is made for the flow of processes for setting whether the display space of the object is widened during the range selection. FIG. 5 is a flowchart illustrating one example of a procedure of the set processes according to the first embodiment. These set processes are executed when the predetermined manipulation designating to make the setting is performed.

As illustrated in FIG. 5, the set unit 40 causes the display unit 20 to display the setting screen 60 (S10). The set unit 40 determines if the setting of whether the display space of the object is to be widened has been changed through the setting screen 60 (S11). For example, the set unit 40 determines whether the setting of the selection area 61 in the setting screen 60 has been changed. If the setting has been changed (S11 Yes), the set unit 40 stores, in the set data 31, a result of the setting whether to widen the display space of the object (S12), and then, the process proceeds to S13.

If the setting has not been changed (S11 No), the set unit 40 determines whether the end of the setting has been designated (S13). If the end of the setting has been designated (S13 Yes), the process is ended. On the other hand, if the end of the setting has not been designated (S13 No), the process returns to the above S11.

Figure 6:
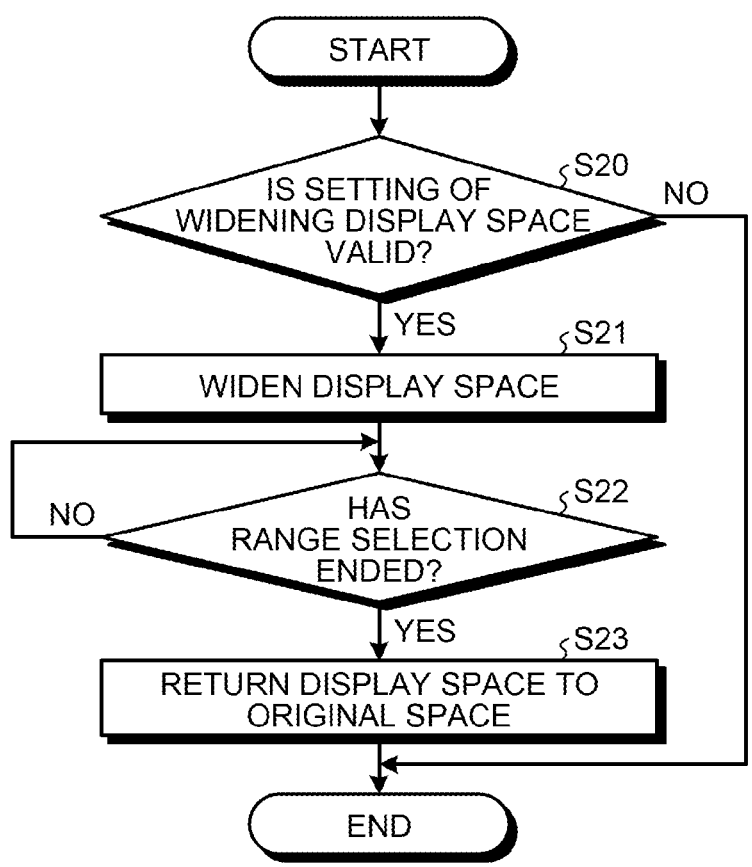
FIG. 6 is a flowchart illustrating one example of a procedure of input control processes according to the first embodiment.

Next, with respect to the information processing apparatus 10 according to the present embodiment, a description is made for a flow of input control processes for controlling an input by a user for the range selection. FIG. 6 is a flowchart illustrating one example of a procedure of input control processes according to the first embodiment. The input control processes are executed when the predetermined manipulation designating a start of the range selection is performed.

As illustrated in FIG. 6, the change unit 42 refers to the set data 31 and determines whether the setting of widening the display space of the object during the range selection is valid (S20). If the setting of widening the display space is invalid (S20 No), the process is ended.

On the other hand, if the setting of widening the display space is valid (S20 Yes), the change unit 42 widens the space between each character of the text and causes the start cursor and the end cursor to be displayed while keeping the character size of the text displayed on the display unit 20 (S21). For example, the change unit 42 changes the space between each character of the text to that set in the set data 31.

A user changes positions of the start cursor and the end cursor to make the range selection.

The change unit 42 determines whether the range selection has been ended (S22). For example, upon receiving the manipulation designating the end of the range selection, the change unit 42 determines that the range selection has been ended. If the range selection has not been ended (S22 No), the process returns to S22 to wait for the end of the range selection. On the other hand, if the range selection has been ended (S22 Yes), the change unit 42 returns the space between each character of the text displayed on the display unit 20 to the original space (S23) to end the process.

Effects

As has been described, the information processing apparatus 10 according to the present embodiment widens the space between each character of the text while keeping the display size of the text, when the range selection of the text displayed on the display unit 20 is performed through the touch operation. Accordingly, the operability of the information processing apparatus 10 during the range selection may be improved.

[b] Second Embodiment

Next, a second embodiment is described. Since a configuration of an information processing apparatus 10 according to the second embodiment is almost the same as that of the information processing apparatus 10 according to the first embodiment illustrated in FIG. 1, different parts are mainly described.

Upon receiving a predetermined manipulation designating a start of range selection, a change unit 42 refers to set data 31 and determines whether a user has set to widen a display space of the object during the range selection. If the user has selected setting of widening the display space, the change unit 42 waits for designation of a start position for the range selection. When the start position for the range selection is designated, the change unit 42 widens the display space of the object while keeping a display size of the object, from a position a predetermined length before the designated start position. For example, while keeping a character size of a text displayed on the display unit 20, the change unit 42 widens the space between each character of the text from a position five characters before the designated start position. Incidentally, the position the predetermined length before the start position may be stored in the set data 31 in order to be externally changeable.

Figure 7:
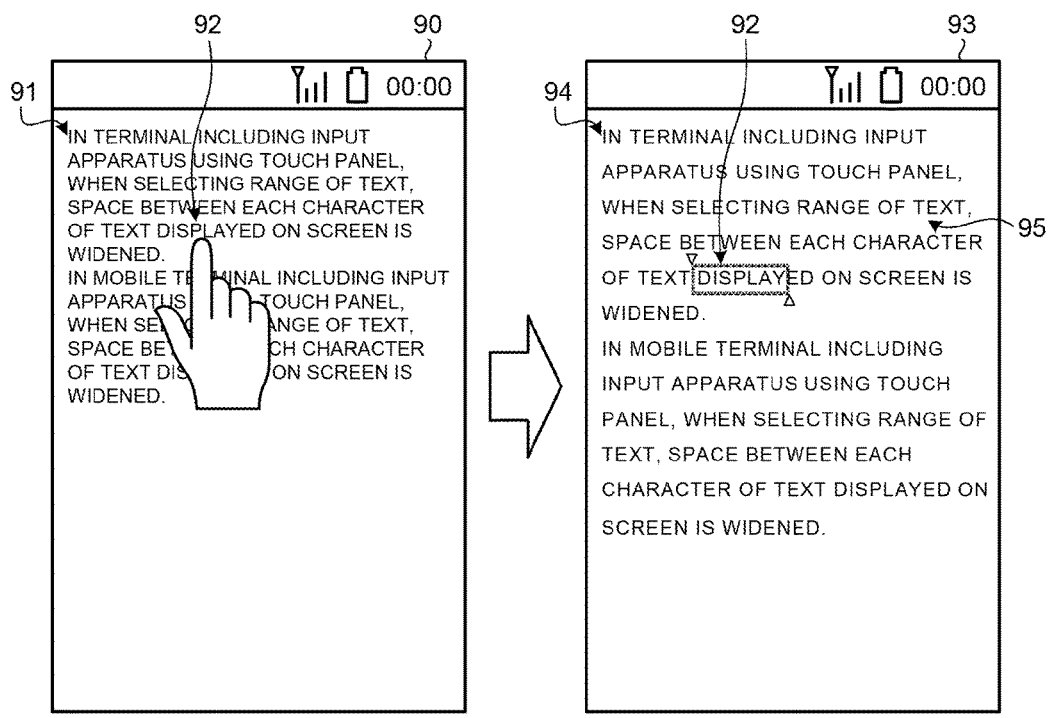
FIG. 7 is a diagram illustrating one example of a change in a display screen.

FIG. 7 is a diagram illustrating one example of a change in a display screen. In an example of FIG. 7, a position 92 as a start position for the range selection is designated through a touch operation in a text 91 displayed on a display screen 90 on the left. In this case, as illustrated in a display screen 93 on the right, the space between each character of a text 94 is widened from a position 95 five characters before a character position corresponding to the position 92.

In this manner, the information processing apparatus 10 according to the present embodiment widens the space between each character of the text from the position a predetermined length before the start position for the range selection. Accordingly, in the information processing apparatus 10, the space between each character of the text part before the position, which is the predetermined length before the start position, remains the same and the space between each character viewed by a user may be maintained. Therefore, the degradation of the visibility of the text for the user may be suppressed. Further, the information processing apparatus 10 widens the space between each character of the text, from the position the predetermined length before the start position for the range selection. Therefore, the operability during the range selection may be improved.

Flow of Processes

Figure 8:
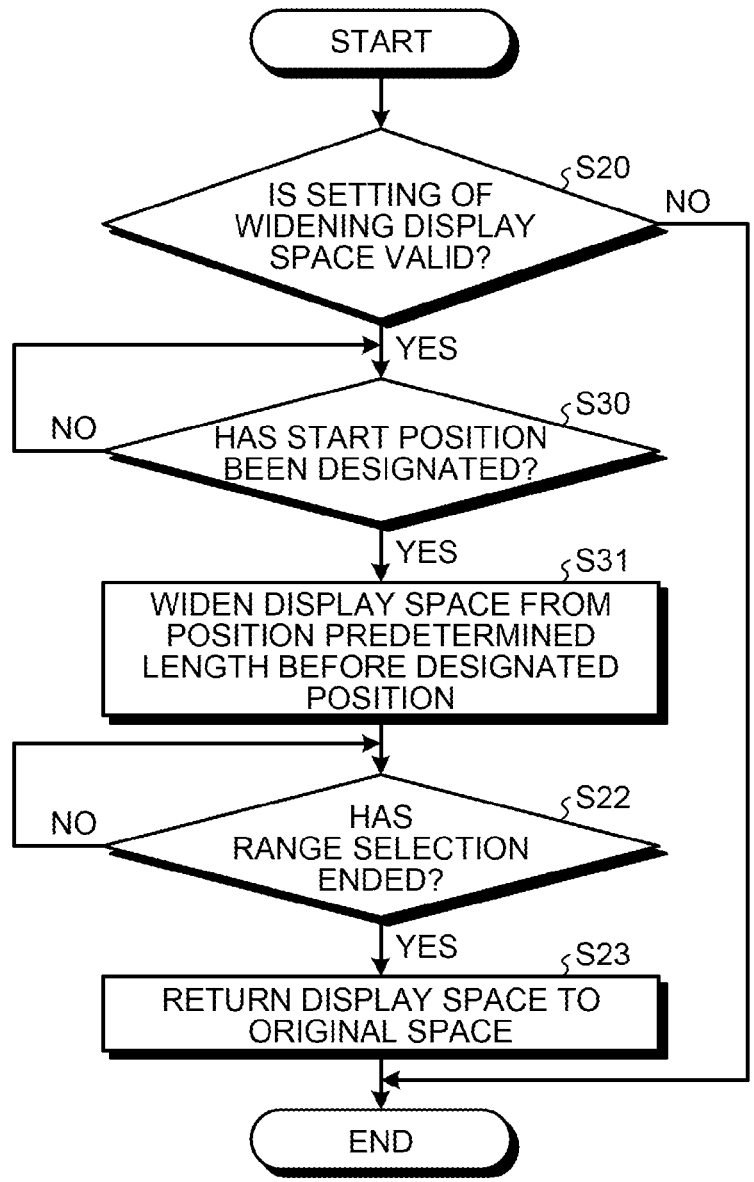
FIG. 8 is a flowchart illustrating one example of a procedure of input control processes according to a second embodiment.

FIG. 8 is a flowchart illustrating one example of a procedure of input control processes according to the second embodiment. Note that identical symbols used in FIG. 6 are given to the processes which are identical to the input control processes according to the first embodiment illustrated in FIG. 6 to omit the duplicate description. Thus, different processes are mainly described.

If setting of widening the display space is valid (S20 Yes), the change unit 42 determines whether a user has designated the start position for the range selection (S30). For example, after receiving the predetermined manipulation designating the start of the range selection, the change unit 42 regards the first touched position on the display screen as the start position for the range selection, and thus, waits for detection of the touch operation on the display screen.

If the start position for the range selection has not been designated (S30 No), the process repeats S30 to wait for the designation of the start position. On the other hand, if the start position for the range selection has been designated (S30 Yes), while keeping the character size of the text, the change unit 42 widens the space between each character of the text from the position the predetermined length before the designated start position (S31).

Effects

As described above, the information processing apparatus 10 according to the present embodiment widens the space between each character of the text, from the position the predetermined length before the start position for the range selection. Accordingly, the information processing apparatus 10 may improve the operability during the range selection while suppressing the degradation of the visibility of the text by a user.

Third Embodiment

Next, a third embodiment is described. Since a configuration of an information processing apparatus 10 according to the third embodiment is substantially the same as that of the information processing apparatus 10 according to the first embodiment illustrated in FIG. 1 and that of the information processing apparatus 10 according to the second embodiment, different parts are mainly described.

After widening a display space of an object for range selection, if selection of a start position or an end position is repeated, a change unit 42 widens the display space of the object according to the number of repetitions. For example, after widening a space between each character of the object, every given number of times the selection of the start position or the end position is continuously repeated, the change unit 42 widens the display space of the object by a predetermined value incrementally. As one example, every three times the start cursor or the end cursor is continuously touched, the change unit 42 widens the space between each character of the text by the predetermined value incrementally.

The change unit 42 stores, in set data 31, a set value of the changed space between each character of the text. Then, hereinafter, during the range selection of the text, the change unit 42 changes a value of the space between each character of the text to the set value stored in the set data 31.

In this manner, if the selection of the start position or the end position is repeated during the range selection, the information processing apparatus 10 according to the present embodiment widens the space between each character of the text according to the number of repetitions. Accordingly, the information processing apparatus 10 may adjust the space between each character of the text to a space allowing a user an easy manipulation.

Further, the information processing apparatus 10 according to the present embodiment stores, in the set data 31, the set value of the changed space between each character of the text, and in selecting the range hereinafter, the apparatus changes the value of the space between each character of the text to the set value stored in the set data 31. Accordingly, in selecting the range hereinafter, the information processing apparatus 10 may display the space between each character of the text allowing a user an easy manipulation.

Flow of Processes

Figure 9:
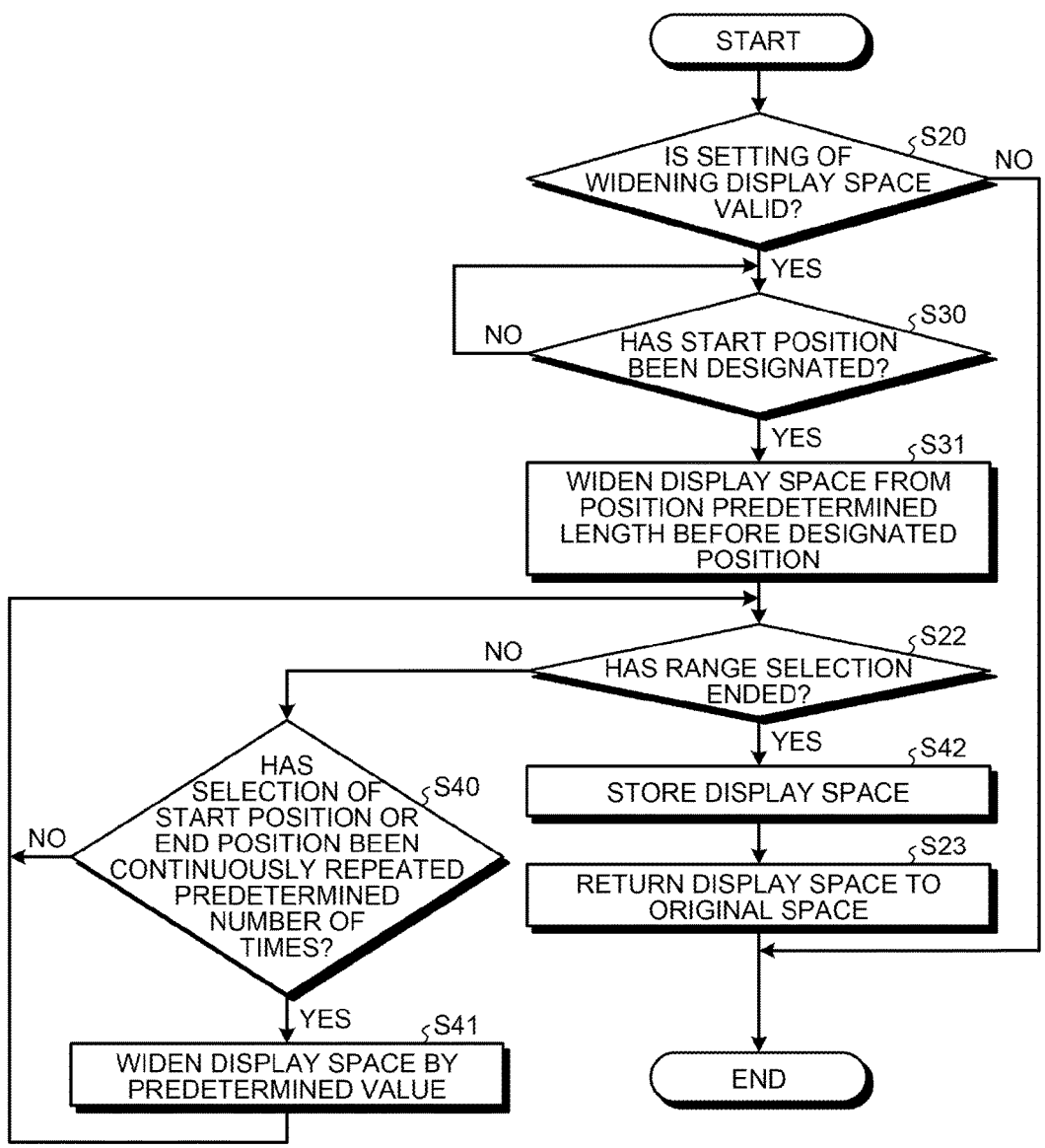
FIG. 9 is a flowchart illustrating one example of a procedure of input control processes according to a third embodiment.

FIG. 9 is a flowchart illustrating one example of a procedure of input control processes according to the third embodiment. Incidentally, since identical symbols used in FIG. 8 are given to the processes identical to the input control processes according to the second embodiment illustrated in FIG. 8 to omit the duplicate description, different processes are mainly described.

If the range selection has not been ended (S22 No), the change unit 42 determines whether the selection of the start position or the end position has been continuously repeated a predetermined number of times (S40). If the selection has not been continuously repeated the predetermined number of times (S40 No), the process returns to the above S22.

On the other hand, if the selection has been continuously repeated the predetermined number of times (S40 Yes), the change unit 42 widens the space between each character of the text by a predetermined value (S41), and the process returns to the above S22.

Further, if the range selection has been ended (S22 Yes), the change unit 42 stores, in the set data 31, the set value of the space between each character of the text (S42).

Effects

As has been described, if the selection of the start position or the end position has been repeated during the range selection, the information processing apparatus 10 according to the present embodiment widens the space between each character of the text according to the number of repetitions. Accordingly, the information processing apparatus 10 may adjust the space between each character of the text to a space allowing a user an easy manipulation.

Further, the information processing apparatus 10 according to the present embodiment stores, in the set data 31, the set value of the changed space between each character of the text, and in selecting the range hereinafter, the apparatus changes the value of the space between each character of the text to the set value stored in the set data 31. Accordingly, in selecting the range hereinafter, the information processing apparatus 10 may display the space between each character of the text allowing a user an easy manipulation.

Fourth Embodiment

Descriptions have been made for the embodiments of the disclosed apparatuses, but the disclosed technique may be carried out in various different embodiments in addition to the above described embodiments. Other embodiments included in the present invention are described below.

For example, in the above embodiments, the descriptions have been made for widening the space between each character of the text, but the disclosed apparatuses are not limited thereto. For example, the change unit 42 may widen the space between each word of the text. That is, the change unit 42 may morphologically and syntactically analyze the text displayed on the display unit 20 to determine a separation part between each word of the text and may widen the space between each word.

Figure 10:
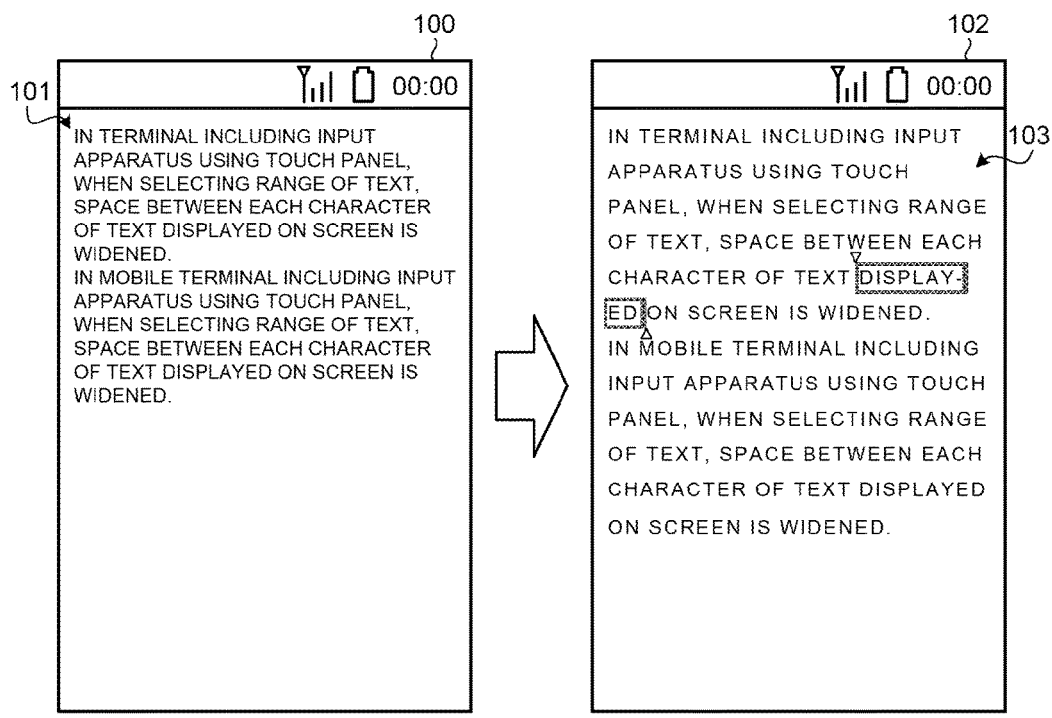
FIG. 10 is a diagram illustrating one example of a change in the display screen.

FIG. 10 is a diagram illustrating one example of a change in a display screen. In the example of FIG. 10, as an illustrated text 103 on a display screen 102 on the right, the space between each word of a text 101 displayed on a display screen 100 on the left is widened. In selecting the range of the text 103, a user usually selects, as a range, a combination of separated words making sentence sense. Accordingly, the information processing apparatus 10 widens the space between each word to improve the operability during the range selection.

Further, in the above embodiments, although the descriptions have been made for widening the space between each character of the text, the disclosed apparatuses are not limited thereto. For example, the space between each line of the text may be widened.

Figure 11:
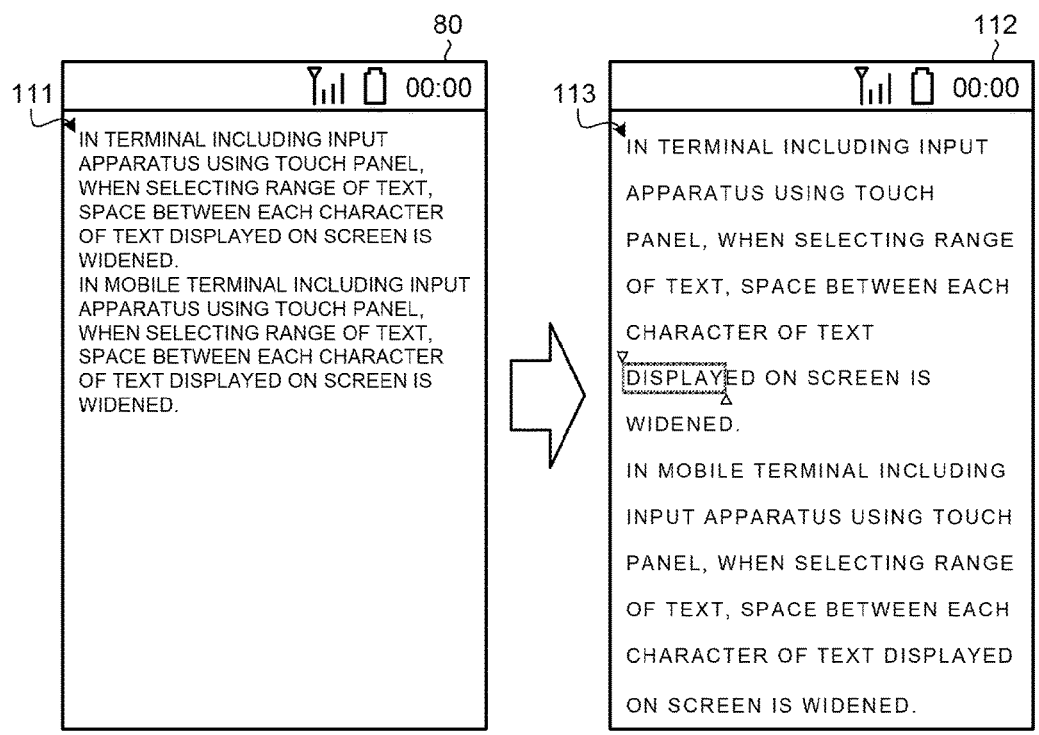
FIG. 11 is a diagram illustrating one example of a change in the display screen.

FIG. 11 is a diagram illustrating one example of a change in a display screen. For example, upon receiving a predetermined manipulation designating a start of the range selection of a text 111 on a display screen 110 on the left, the change unit 42 widens the space between each character and the space between each line while keeping the character size as illustrated in a text 113 on a display screen 112 on the right. Accordingly, even if the space between each line of the displayed text is narrow, the information processing apparatus 10 is less likely to recognize a position of an unintended line as a position of an intended line.

Further, in the above embodiments, the descriptions have been made for widening the display space of the text displayed as the object on the display unit 20, but the disclosed apparatuses are not limited thereto. For example, regarding an icon or a thumbnail as the object, the change unit 42 may widen the display space of the icon or the thumbnail while keeping the display size of the icon or the thumbnail during the range selection of the icon or the thumbnail.

Figure 12:
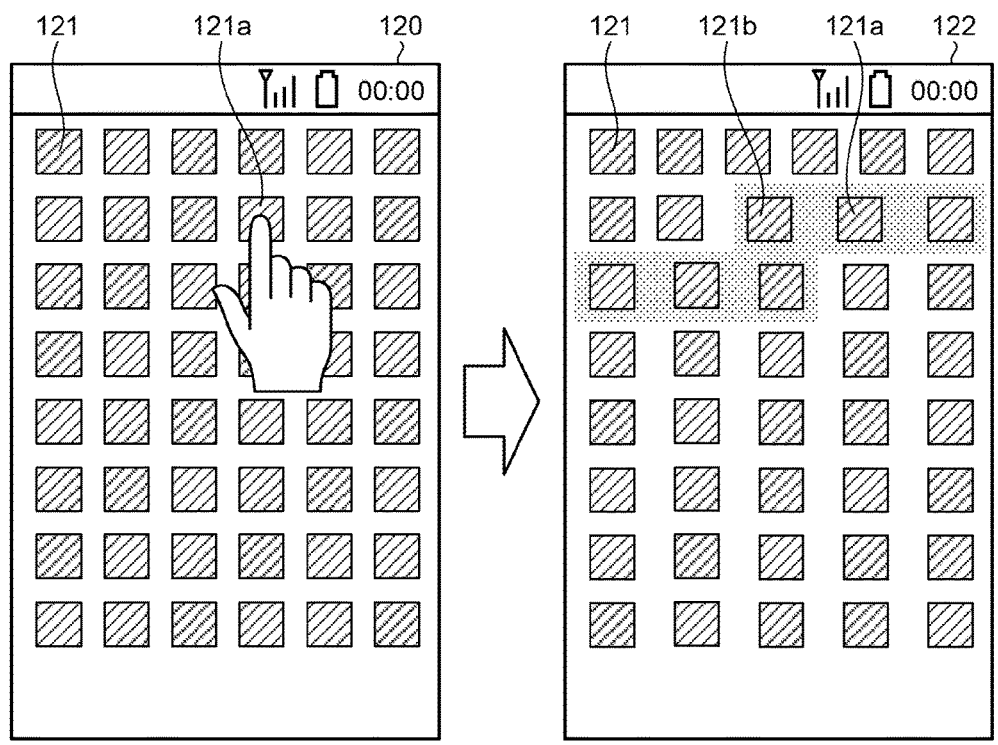
FIG. 12 is a diagram illustrating one example of a change in the display screen.

FIG. 12 is a diagram illustrating one example of a change in a display screen. The example of FIG. 12 illustrates a plurality of images 121 of the icon or the thumbnail on a display screen 120 on the left. For example, when an image 121a is selected on the display screen 120 at the left side, in a display screen 122 on the right, the change unit 42 widens the display space between the images 121 from after an image 121b which is one image before the image 121a. Accordingly, even when selecting the range of the plurality of images of the displayed icon or thumbnail, the information processing apparatus 10 may improve the operability during the range selection.

Each element of each apparatus illustrated in the diagrams is functional and conceptual, and each element is not necessarily physically configured as illustrated in the diagram. In other words, specific dispersion/integration of each apparatus is not limited to the aspect illustrated in the diagram, and all apparatuses or a part thereof may be functionally or physically dispersed/integrated in any unit according to a load and a use condition of each apparatus. For example, the process units such as the set unit 40, the display control unit 41, and the change unit 42 in the information processing apparatus 10 may be appropriately integrated. Further, the processes of each process unit may be appropriately dispersed to the processes of the plurality of process units. Furthermore, all or any one part of each process function of each process unit is realized using a CPU and a program to be analyzed and executed by the CPU, or may be realized as hardware with a wired logic.

Input Control Program

Figure 13:
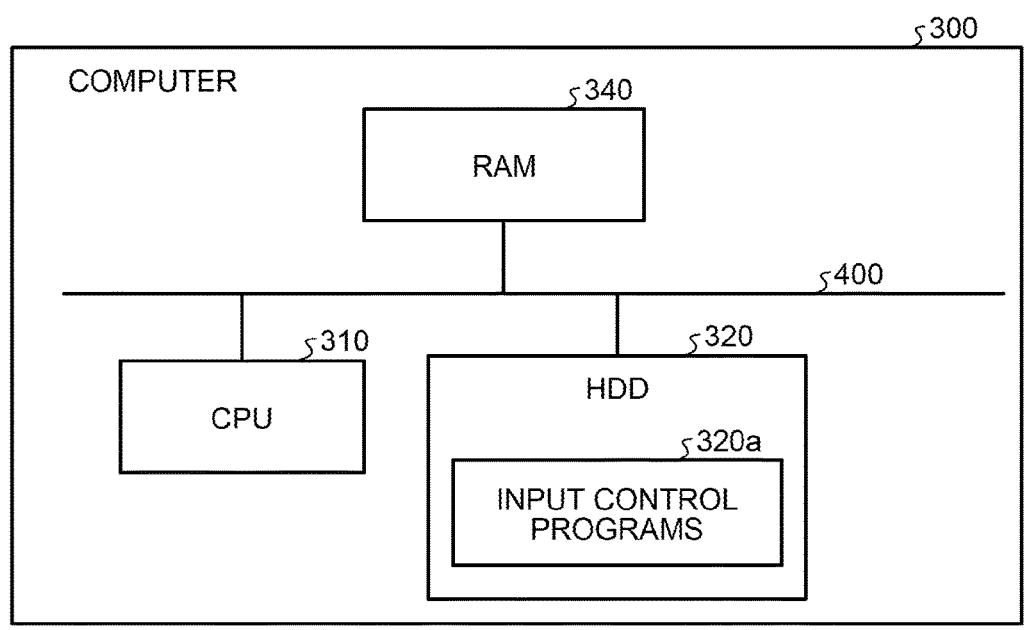
FIG. 13 is a diagram illustrating a computer that executes an input control program.

Further, pre-prepared programs may be executed in a computer system including a personal computer and a workstation to realize the various processes described in the above embodiments. Then, description is made below for one example of a computer system for executing a program having the same function as each unit in the above embodiments. FIG. 13 is a diagram illustrating a computer for executing an input control program.

As illustrated in FIG. 13, a computer 300 includes a central processing unit (CPU) 310, a hard disk drive (HDD) 320, and a random access memory (RAM) 340. The units 300 to 340 are connected with each other through a bus 400.

The HDD 320 pre-stores an input control program 320a exerting functions similar to those of the set unit 40, the display control unit 41, and the change unit 42 included in the information processing apparatus 10 above. Incidentally, the input control program 320a may be appropriately separated.

Further, the HDD 320 stores various types of information. For example, the HDD 320 stores the OS and various types of data used for input control for the range selection.

Furthermore, the CPU 310 reads the input control program 320a from the HDD 320 for executing the program, whereby the program acts similarly to each process unit in the embodiments. That is, the input control program 320a acts similarly to the set unit 40, the display control unit 41, and the change unit 42.

Incidentally, the HDD 320 does not necessarily store the above-described input control program 320a from the start.

For example, the program is stored in a "portable physical medium" such as a flexible disk (FD), a CD-ROM, a DVD disc, a magnetic optical disk, and an IC card to be inserted into the computer 300. Then, the program may be read from the medium and executed by the computer 300.

Alternatively, the program is stored in "another computer (or server)" connected to the computer 300 through a public line, the Internet, a LAN, and a WAN. Then, the program may be read from the computer or the server and executed by the computer 300.

According to an aspect of the present invention, the operability during the range selection may be improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
    a display unit that displays objects;
    a detection unit that detects a touch operation on the display unit; and
    a change unit that widens, when range selection within the objects displayed on the display unit through a touch operation is started, a display space between the objects from an object that is positioned a predetermined length before a start position designated by the range selection with keeping a display size of each of the objects unchanged from the display size in which each of the objects is displayed before the range selection is started, until the range selection is ended, wherein when selection of the start position or an end position for the range selection is repeated, the change unit widens the display space between the objects according to a number of repetitions.

2. The information processing apparatus according to claim 1, wherein
    the display unit displays a text as the objects, and
    the change unit widens a display space between each character of the text with keeping a display size of a character of the text unchanged from the display size in which the character is displayed before the range selection is started, until the range selection is ended.

3. The information processing apparatus according to claim 2, wherein
    the change unit widens the display space between each word of the text.

4. The information processing apparatus according to claim 2, wherein
    the change unit widens a display space between each line of the text.

5. The information processing apparatus according to claim 1, wherein
    the display unit displays icons or thumbnails as the objects, and
    the change unit widens a display space between the icons or the thumbnails with keeping a display size of the icons or the thumbnails unchanged from the display size in which the icons or the thumbnails are displayed before the range selection is started, until the range selection is ended.

6. The information processing apparatus according to claim 1, wherein
    the change unit widens the display space when a value of the display space between the objects displayed on the display unit is equal to or less than a predetermined value.

7. The information processing apparatus according to claim 1, further comprising:
    a storage unit that stores a set value of the display space changed by the change unit,
    wherein the change unit changes the display space between the objects to the set value of the display space stored in the storage unit.

8. A non-transitory computer-readable recording medium having stored therein an input control program for causing a computer to execute a process, the process comprising:
    displaying objects on a display unit
    widening, when range selection within the objects displayed on the display unit through a touch operation is started, a display space between the objects from an object that is positioned a predetermined length before a start position designated by the range selection with keeping a display size of each of the objects unchanged from the display size in which each of the objects is displayed before the range selection is started, until the range selection is ended, and widening, when selection of the start position or an end position for the range selection is repeated, the display space between the objects according to a number of repetitions.

9. An input control method comprising:
    displaying objects on a display unit
    widening, when range selection within the objects displayed on the display unit through a touch operation is started, a display space between the objects from an object that is positioned a predetermined length before a start position designated by the range selection with keeping a display size of each of the objects unchanged from the display size in which each of the objects is displayed before the range selection is started, until the range selection is ended, and widening, when selection of the start position or an end position for the range selection is repeated, the display space between the objects according to a number of repetitions.

* * * * *